J. PINTO.
LOCK NUT.
APPLICATION FILED SEPT. 24, 1914.

1,138,409.

Patented May 4, 1915.

Inventor
Joseph Pinto

Witnesses
J. Milton Jester
C. Everett

Attorney

UNITED STATES PATENT OFFICE.

JOSEPH PINTO, OF OSCEOLA MILLS, PENNSYLVANIA.

LOCK-NUT.

1,138,409. Specification of Letters Patent. Patented May 4, 1915.

Application filed September 24, 1914. Serial No. 863,254.

*To all whom it may concern:*

Be it known that I, JOSEPH PINTO, a citizen of the United States, residing at Osceola Mills, in the county of Clearfield and State of Pennsylvania, have invented certain new and useful Improvements in Lock-Nuts, of which the following is a specification.

My invention relates to securing devices, particularly for bolts and nuts, and has for its object the provision of novel means whereby a nut may be locked upon a bolt for preventing accidental removal therefrom.

An important object is the provision of a device of this character in which a nut may be screwed upon a bolt but which may not be unscrewed therefrom unless the locking means carried thereby is released by the operator.

A further object is the provision of a nut lock which will be simple and inexpensive to manufacture, efficient and positive in action, and a general improvement of the art.

Figure 1:
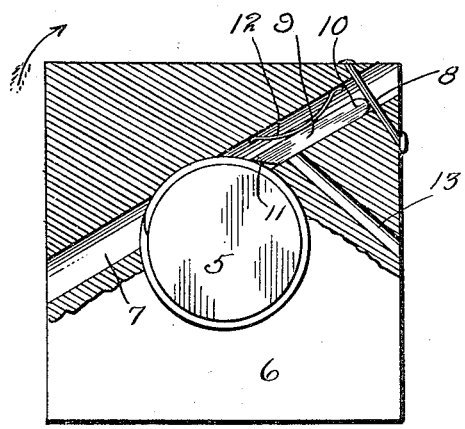
Figure 2:
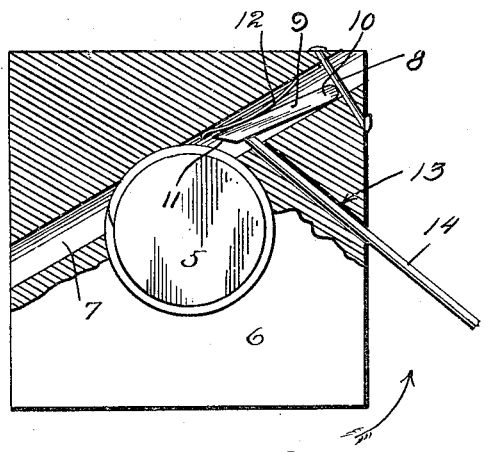

With these and other objects and advantages in view, my invention consists in the novel construction and arrangement to be hereinafter more fully described and claimed, and illustrated in the accompanying drawings, in which, Figure 1 is a view of a nut having my improved locking means therein, the nut being shown applied to a bolt, parts being broken away in section, and, Fig. 2 is a similar view, showing the locking means released so that the nut may be unscrewed.

Referring more particularly to the drawings, the numeral 5 designates a bolt, to which my improved nut is adapted to be applied. The nut 6 is provided with a hole or passage 7, which extends preferably from one corner of the nut and has its outer side tangent to the bolt 5, the passage 7 extending into the screw-threaded opening of the nut. A pin 8 is secured in the nut 6 and extends transversely across one end of the passage 7.

In order to lock the nut upon the bolt I provide a latch member 9, within the passage 7. One end of the latch member 9 is rounded, as shown at 10, and normally rests against the transverse pin 8, and the other end is inclined to form a tooth 11. A leaf-spring 12 is disposed within the passage 7, having its ends bearing against the outer side thereof and its bowed portion engaging said latch member 9 for holding it in engagement with the inner face of the passage, as shown in Fig. 1.

The parts being in the position shown in Fig. 1, when it is desired to screw the nut 6 upon the bolt 5, the nut is rotated in the direction of the arrow, whereupon the movement of the nut will be unimpeded, as the engagement of the tooth 11 with the threads of the bolt will cause the latch member 9 to move outward slightly against the resistance of the spring 12, thus allowing the tooth 11 to ride idly over the threads. If, however, any attempt is made to move the nut 6 in the opposite direction for unscrewing it from the bolt, the latch member 9 will bear against the inner face of the passage 7 and the sharp edge of the tooth 11 will then bite into the threads of the bolt, thereby preventing the removal of the nut from the bolt.

When it is desired, however, to remove the nut, I provide means for releasing the tooth 11 from engagement with the threads of the bolt so that the nut may be turned. To this end I provide an opening 13 in the nut extending into the passage 7 adjacent the inner end of the latch member 9. When it is desired to unscrew the nut I insert a rod 14 through the opening 13 and press the inner end of the latch member 9 outwardly against the resistance of the spring 12, as shown in Fig. 2, whereupon the latch member will swing at the point where its rounded end 10 abuts against the pin 8, thus causing the tooth 11 to swing outwardly entirely out of contact with the threads of the bolt.

From the foregoing description and a study of the drawing it will be apparent that I have thus provided a nut which may be easily and quickly screwed upon a bolt and which is incapable of accidental displacement thereon and which may yet be quickly removed therefrom at the will of the operator.

It will be readily understood that I may make various changes in the form, construction, arrangement and location of parts, without departing from the spirit of the invention as defined by the subjoined claim.

Having thus described my invention, what I claim is:—

In combination with a bolt, a lock nut comprising a nut threaded upon the bolt and provided with a recess communicating with the bore of the nut and tangential to said bore at the outer wall of the recess, a catch member disposed within said recess, a transverse pin extending through the outer end of said recess and bearing against one end of said catch member, a leaf spring disposed in said recess, bearing against one wall thereof and normally forcing said catch member against the opposite wall thereof, and a tooth formed on said catch member and normally contacting with the threads on said bolt, whereby movement of said nut for screwing it upon said bolt will cause movement of said catch member in opposition to said leaf spring and whereby movement of said nut for unscrewing it from said bolt will cause said tooth to bite into said thread.

In testimony whereof I have affixed my signature in presence of two witnesses.

JOSEPH PINTO.

Witnesses:
JOHN PINTO,
F. H. McCULLY.

Copies of this patent may be obtained for five cents each, by addressing the "Commissioner of Patents, Washington, D. C."